United States Patent
Holman et al.

(10) Patent No.: US 12,196,454 B2
(45) Date of Patent: Jan. 14, 2025

(54) WATER HEATER AND METHOD OF OPERATING THEREOF

(71) Applicant: Rheem Manufacturing Company, Atlanta, GA (US)

(72) Inventors: Edward G. Holman, Woodstock, GA (US); Michael C. Ezell, Montgomery, AL (US); David I. Vega, Montgomery, AL (US); Patrick L Figueroa, Indianapolis, IN (US); Raheel A. Chaudhry, Montgomery, AL (US)

(73) Assignee: Rheem Manufacturing Company, Atlanta, GA (US)

( * ) Notice: Subject to any disclaimer, the term of this patent is extended or adjusted under 35 U.S.C. 154(b) by 508 days.

(21) Appl. No.: 17/345,437

(22) Filed: Jun. 11, 2021

(65) Prior Publication Data

US 2022/0397305 A1    Dec. 15, 2022

(51) Int. Cl.
    *F24H 9/20*    (2022.01)
    *F24H 1/00*    (2022.01)
    *F24H 9/00*    (2022.01)

(52) U.S. Cl.
    CPC ......... *F24H 9/2014* (2013.01); *F24H 1/0018* (2013.01); *F24H 9/0005* (2013.01)

(58) Field of Classification Search
    None
    See application file for complete search history.

(56) References Cited

U.S. PATENT DOCUMENTS

| | | | | |
|---|---|---|---|---|
| 4,941,608 A | * | 7/1990 | Shimizu | F24D 19/1051 236/12.12 |
| 5,315,291 A | * | 5/1994 | Furr | G01M 3/16 340/604 |
| 5,347,956 A | * | 9/1994 | Hughes | F24H 9/133 236/12.21 |
| 5,499,621 A | * | 3/1996 | Trihey | F24D 17/00 431/286 |

(Continued)

FOREIGN PATENT DOCUMENTS

EP    3721142 A1    10/2020

OTHER PUBLICATIONS

International Search Report for PCT/US2022/032535 dated Sep. 21, 2022.

*Primary Examiner* — Thor S Campbell
(74) *Attorney, Agent, or Firm* — Eversheds Sutherland (US) LLP

(57) ABSTRACT

The present disclosure provides a water heater including a bypass conduit to allow flow of cold water from an inlet pipe to an outlet pipe, and an outlet temperature sensor coupled to the outlet pipe downstream of an outlet of the bypass conduit, to sense temperature of mixture of hot water and cold water in the outlet pipe. An electronic mixing valve is disposed along the inlet pipe to receive temperature data of water mixture from the outlet temperature sensor and compare temperature of the water mixture with a predefined temperature value. In response to determining that the water mixture is flowing through the outlet pipe, the electronic mixing valve regulates the flow of cold water through at least one of the bypass conduit and the inlet pipe until the temperature of the water mixture is within a predetermined range of the predefined temperature value.

18 Claims, 8 Drawing Sheets

(56) References Cited

U.S. PATENT DOCUMENTS

| | | | | |
|---|---|---|---|---|
| 5,588,088 | A * | 12/1996 | Flaman | F24D 17/00 126/362.1 |
| 5,808,277 | A * | 9/1998 | Dosani | F24D 17/0073 219/486 |
| 6,370,328 | B1 * | 4/2002 | Mottershead | F24H 9/0021 392/452 |
| 7,298,968 | B1 * | 11/2007 | Boros | F24H 15/223 392/494 |
| 7,744,007 | B2 * | 6/2010 | Beagen | G05D 23/134 236/12.12 |
| 8,083,104 | B2 | 12/2011 | Roetker et al. | |
| 8,422,870 | B2 * | 4/2013 | Nelson | F24H 15/12 392/464 |
| 8,453,610 | B2 * | 6/2013 | Houle | F28D 20/0034 122/37 |
| 8,733,666 | B2 * | 5/2014 | Beagen | F16K 31/002 236/12.1 |
| 9,244,466 | B2 | 1/2016 | DuPlessis et al. | |
| 9,268,342 | B2 * | 2/2016 | Beyerle | F24H 9/2007 |
| 9,310,813 | B2 * | 4/2016 | Farris | F24H 15/174 |
| 9,638,439 | B2 | 5/2017 | Shaffer et al. | |
| 9,885,497 | B2 * | 2/2018 | Ward | F24H 15/215 |
| 9,920,953 | B2 | 3/2018 | Ward et al. | |
| 9,970,681 | B2 | 5/2018 | Ward et al. | |
| 10,139,135 | B1 * | 11/2018 | Lesage | F24D 19/1051 |
| 10,274,104 | B2 | 4/2019 | Farris et al. | |
| 10,466,727 | B2 | 11/2019 | Shaffer | |
| 11,713,905 | B2 * | 8/2023 | Laurencelle | F24H 15/14 122/14.3 |
| 2012/0325337 | A1 * | 12/2012 | Nakagawa | F24H 9/2021 137/341 |
| 2013/0202277 | A1 * | 8/2013 | Roetker | F24H 1/202 392/441 |
| 2014/0026970 | A1 | 1/2014 | DuPlessis et al. | |
| 2014/0202549 | A1 | 7/2014 | Hazzard et al. | |
| 2016/0138830 | A1 * | 5/2016 | Lesage | F24H 15/414 219/486 |
| 2016/0178677 | A1 * | 6/2016 | Mansouri | G01K 1/024 700/297 |
| 2017/0122458 | A1 * | 5/2017 | Farris | F16K 37/0091 |
| 2018/0274793 | A1 | 9/2018 | Shaffer | |

* cited by examiner

WATER HEATER AND METHOD OF OPERATING THEREOF

TECHNICAL FIELD

The present disclosure relates, in general, to a water heater and, more specifically relates, to a system and method for regulating temperature of hot water drawn from the water heater.

BACKGROUND

Generally, water heaters are used to deliver hot water to residential and commercial use. Water heaters include a mixing valve to regulate temperature of hot water extracted from the tank of the water heater. Conventionally known mixing valve includes mechanical components, where desired outlet temperature is set manually using a dial or a knob provided in a body of the mixing valve. Additionally, the mixing valve is located proximal to an outlet pipe that allows flow of heated water from a tank of the water heater. Such location of the mixing valve may cause a slug of hot water in the body of the mixing valve prior to mixing with cold water, thereby affecting operation of the mixing valve. On the other hand, electronic mixing valves are capable of being integrated with control system of the water heater to regulate temperature of hot water supplied from the water heater. However, the electronic mixing valves still suffer from overshoot in temperature of heated water supplied at the beginning of draw of water from the water heater due to proximity with respect to the outlet pipe.

SUMMARY

According to one aspect of the present disclosure, a water heater is disclosed. The water heater includes a tank, an inlet pipe configured to allow ingress of cold water to the tank, an outlet pipe configured to allow egress of hot water from the tank, and a bypass conduit configured to allow flow of cold water from the inlet pipe to the outlet pipe. The water heater further includes an outlet temperature sensor coupled to the outlet pipe downstream of an outlet of the bypass conduit. The outlet temperature sensor is configured to sense temperature of mixture of hot water and cold water in the outlet pipe. The water heater further includes an electronic mixing valve disposed along the inlet pipe and communicably coupled to the outlet temperature sensor. The electronic mixing valve is configured to receive temperature data of the mixture of hot water and cold water from the outlet temperature sensor and compare temperature of the mixture of hot water and cold water with a predefined temperature value. In response to determining that the mixture of hot water and cold water is flowing through the outlet pipe, the electronic mixing valve is configured to regulate the flow of cold water through at least one of the bypass conduit and the inlet pipe until the temperature of the mixture of hot water and cold water is within a predetermined range of the predefined temperature value.

In an embodiment, the water heater further includes one or more tank temperature sensors mounted on the tank and configured to sense temperature of water within the tank. In such arrangement, the electronic mixing valve is communicably coupled to the one or more tank temperature sensors and configured to receive temperature data of water within the tank based on an input from the one or more tank temperature sensors.

In an embodiment, the electronic mixing valve is further configured to determine whether the temperature of water within the tank is greater than a threshold temperature value and actuate a mixing valve motor based on the flow of cold water through the bypass conduit, when the temperature of the water within the tank is greater than the threshold temperature value.

In an embodiment, the electronic mixing valve is further configured to operate the mixing valve motor to restrict the flow of cold water through the bypass conduit and allow the flow of cold water into the tank.

In an embodiment, the water heater further includes one or more heaters configured to heat the water present in the tank and a control module configured to regulate supply of electric current to the one or more heaters. In such arrangement, the electronic mixing valve is further configured to actuate the control module to regulate supply of the electric current to the one or more heaters when the temperature of the water within the tank is greater than the threshold temperature value.

In an embodiment, the electronic mixing valve is further configured to reduce an amount of cold water flowing through the bypass conduit when the temperature of hot water is less than the predefined temperature value, based on the flow of the mixture of hot water and cold water through the outlet pipe.

In an embodiment, the water heater further includes an outlet flow sensor coupled to the outlet pipe downstream of the outlet of the bypass conduit. The electronic mixing valve is communicably coupled to the outlet flow sensor and configured to determine the flow of mixture of hot water and cold water through the outlet pipe based on an input from the outlet flow sensor.

According to another aspect of the present disclosure, a water heater is disclosed. The water heater includes a tank, an inlet pipe configured to allow ingress of cold water to the tank, an outlet pipe configured to allow egress of hot water from the tank, and a bypass conduit configured to allow flow of cold water from the inlet pipe to the outlet pipe. The water heater further includes an outlet temperature sensor coupled to the outlet pipe downstream of an outlet of the bypass conduit. The outlet temperature sensor is configured to sense temperature of mixture of hot water and cold water in the outlet pipe. The water heater further includes an electronic mixing valve assembly communicably coupled to the outlet temperature sensor. The electronic mixing valve assembly includes a first mixing valve motor coupled to the bypass conduit, a second mixing valve motor coupled to the inlet pipe, and a mixing valve controller operably coupled to each of the first mixing valve motor and the second mixing valve motor. The mixing valve controller is configured to receive temperature data of the mixture of hot water and cold water from the outlet temperature sensor and compare temperature of the mixture of hot water and cold water with a predefined temperature value. In response to determining that the mixture of hot water and cold water is flowing through the outlet pipe, the mixing valve controller is configured to actuate at least one of the first mixing valve motor and the second mixing valve motor to regulate flow of cold water through the bypass conduit and the inlet pipe, respectively, until the temperature of the mixture of hot water and cold water is within a predetermined range of the predefined temperature value.

In an embodiment, the water heater further includes a leak sensor coupled to the tank and configured to sense water leak from the tank, and a control module coupled to the leak sensor and configured to determine the water leak from the tank based on an input from the leak sensor.

In an embodiment, the mixing valve controller is communicably coupled to the control module and configured to actuate each of the first mixing valve motor and the second mixing valve motor to restrict the flow of cold water through the bypass conduit and the inlet pipe, respectively, in response to determining water leak from the tank.

In an embodiment, the water heater further includes a first flow sensor mounted on the inlet pipe upstream of the second mixing valve motor and a second flow sensor mounted on the outlet pipe downstream of the outlet of the bypass conduit. The first flow sensor is configured to sense the flow of cold water through the inlet pipe and the second flow sensor is configured to sense the flow of the mixture of hot water and cold water through the outlet pipe. Each of the first flow sensor and the second flow sensor is communicably coupled to the mixing valve controller.

In an embodiment, the water heater further includes one or more tank temperature sensors mounted on the tank and configured to sense temperature of water within the tank. In such arrangement, the mixing valve controller is communicably coupled to the one or more tank temperature sensors and configured to receive temperature data of water within the tank based on an input from the one or more tank temperature sensors.

In an embodiment, the mixing valve controller is further configured to actuate the first mixing valve motor to an open condition and the second mixing valve motor to a closed condition to reduce the temperature of the mixture of hot water and cold water, in response to determining that the temperature of the mixture of hot water and cold water is greater than the predefined temperature value.

In an embodiment, the mixing valve controller is further configured to actuate the first mixing valve motor to a closed condition and the second mixing valve motor to an open condition to increase the temperature of the mixture of hot water and cold water, in response to determining that the temperature of the mixture of hot water and cold water is less than the predefined temperature value.

According to yet another aspect of the present disclosure, a method of operating a water heater is disclosed. The method includes receiving, from an outlet temperature sensor, temperature data of a mixture of hot water and cold water flowing through an outlet pipe of the water heater. The method further includes comparing temperature of the mixture of hot water and cold water with a predefined temperature value. In response to determining that the mixture of hot water and cold water is flowing through the outlet pipe, the method also includes regulating the flow of cold water through at least one of a bypass conduit and an inlet pipe of the water heater until the temperature of the mixture of hot water and cold water is within a predetermined range of the predefined temperature value.

The method further includes determining, via a leak sensor, whether water is leaking from a tank of the water heater and stopping the flow of cold water through the inlet pipe and the bypass conduit, based on determining presence of the water leak.

The method further includes actuating a first mixing valve motor of an electronic mixing valve assembly to an open condition and a second mixing valve motor of the electronic mixing valve assembly to a closed condition to reduce the temperature of the mixture of hot water and cold water, in response to determining that the temperature of the mixture of hot water and cold water is greater than the predefined temperature value.

These and other aspects and features of non-limiting embodiments of the present disclosure will become apparent to those skilled in the art upon review of the following description of specific non-limiting embodiments of the disclosure in conjunction with the accompanying drawings.

BRIEF DESCRIPTION OF THE DRAWINGS

A better understanding of embodiments of the present disclosure (including alternatives and/or variations thereof) may be obtained with reference to the detailed description of the embodiments along with the following drawings, in which.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

As used herein, the terms "a", "an" and the like generally carry a meaning of "one or more," unless stated otherwise. Further, the terms "approximately", "approximate", "about", and similar terms generally refer to ranges that include the identified value within a margin of 20%, 10%, or preferably 5%, and any values therebetween.

Aspects of the present disclosure are directed to a water heater and methods of operating the water heater. The water heater includes an electronic mixing valve disposed along an inlet pipe or a bypass pipe extending between the inlet pipe and an outlet pipe of the water heater unlike a conventional configuration of mounting mechanical mixing valve on the outlet pipe. With such arrangement, the water heater of the present disclosure achieves enhanced performance by reducing temperature overshoot at beginning of a hot water draw from the water heater.

Figure 1:
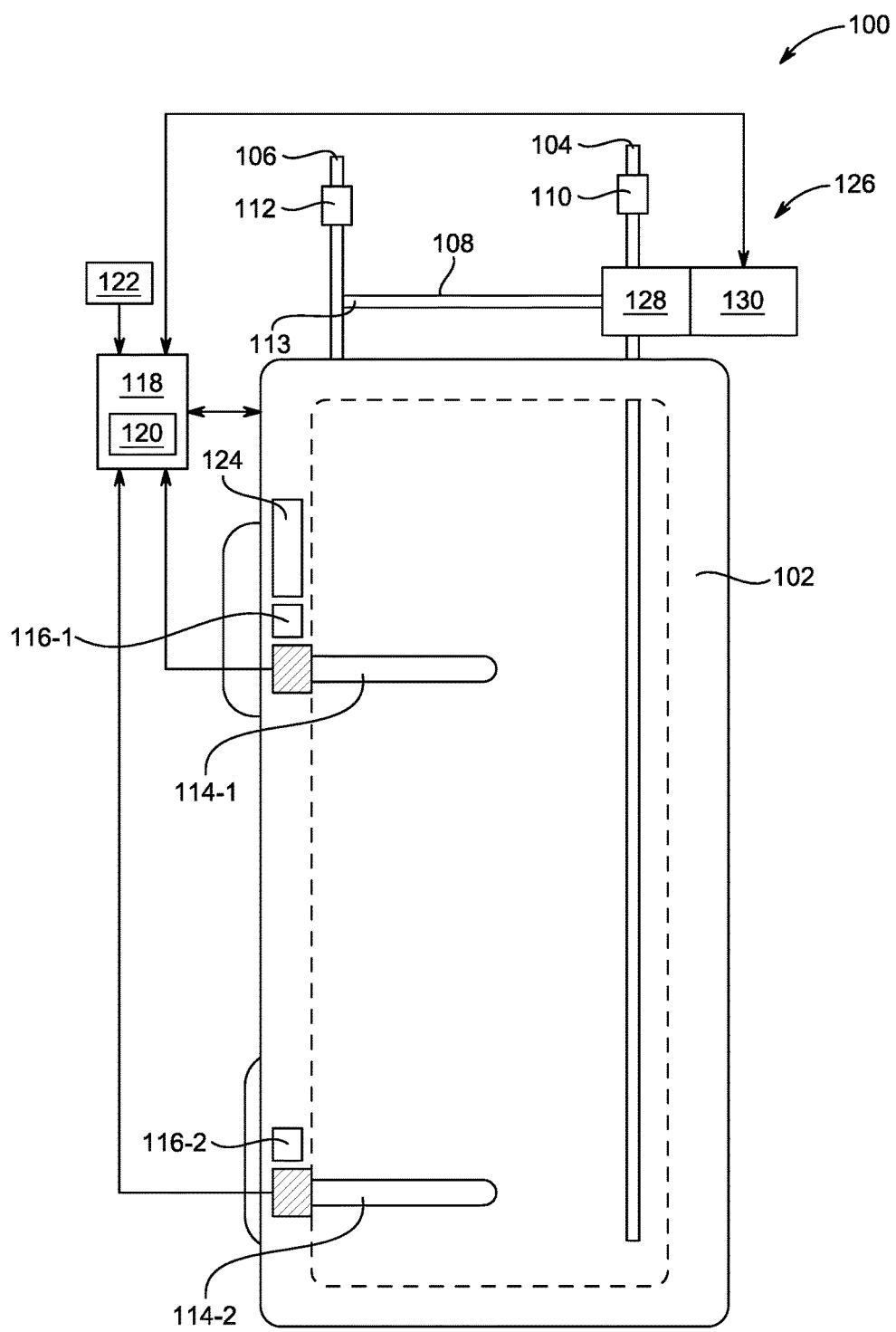
FIG. 1 is a schematic diagram of a water heater including an electronic mixing valve disposed along an inlet pipe thereof, according to an embodiment of the present disclosure.

Referring to FIG. 1, a schematic view of a water heater 100, according to an embodiment of the present disclosure. The water heater 100, generally vertically oriented, includes a tank 102, an inlet pipe 104 configured to allow ingress of cold water to the tank 102, and outlet pipe 106 configured to allow egress of hot water from the tank 102, and a bypass conduit 108 extending between the inlet pipe 104 and the outlet pipe 106. Hot water from the water heater 100 may be supplied to, for example, a bathing space, a shower, a sink, or a home appliance. The bypass conduit 108 is configured to allow flow of cold water from the inlet pipe 104 to the outlet pipe 106. The inlet pipe 104 extends into the tank 102 as a dip pipe towards a bottom portion of the tank 102. The water heater 100 also includes an inlet temperature sensor 110 coupled to the inlet pipe 104 and an outlet temperature sensor 112 coupled to the outlet pipe 106 downstream of an outlet 113 of the bypass conduit 108. The outlet 113 of the bypass conduit 108 is indicative of a junction at which the bypass conduit 108 fluidly connects with the outlet pipe 106. As such, at the outlet 113, the cold water from the bypass conduit 108 mixes with the hot water in the outlet pipe 106.

The inlet temperature sensor 110 is configured to sense temperature of cold water in the inlet pipe 104 and the outlet temperature sensor 112 is configured to sense temperature of mixture of hot water and cold water in the outlet pipe 106. For the purpose of heating the water present in the tank 102, the water heater 100 includes one or more heaters 114, such as a first heater 114-1 and a second heater 114-2, extending from a wall of the tank 102 into a storage volume of the tank 102. In an example, each of the one or more heaters 114 may be implemented as an electric resistance element, a microwave element, an induction element, or any suitable heating element or combination thereof.

The water heater 100 further includes one or more tank temperature sensors 116 mounted on the tank 102 and configured to sense temperature of water within the tank 102. In an embodiment, the water heater 100 includes a first temperature sensor 116-1 mounted on the wall of the tank 102 and proximal to a base of the first heater 114-1, and a second temperature sensor 116-2 mounted on the wall of the tank 102 and proximal to a base of the second heater 114-2. As such, the first temperature sensor 116-1 and the second temperature sensor 116-2 are configured to sense temperature of water around a region of the first heater 114-1 and the second heater 114-2, respectively. In an example, each of the temperature sensors 116 may be a thermocouple or a thermistor. In some embodiments, the temperature sensors 116 may be located at other locations within the storage volume of the tank 102 to accurately measure the temperature of the tank 102.

In an embodiment, the water heater 100 also includes a control module 118 configured to regulate supply of electric current to each of the one or more heaters 114. In some embodiments, the control module 118 may be implemented as a processor, such as one or more microprocessors, microcomputers, digital signal processors, central processing units, state machines, logic circuitries, or any devices that manipulate signals based on operational instructions. Among other capabilities the processor may be configured to fetch and execute computer-readable instructions stored in a memory 120 of the control module 118. Various functions of the processor may be provided using dedicated hardware as well as hardware capable of executing software in association with appropriate software. When provided by the processor, the functions may be provided by a single dedicated processor, by a single shared processor, or by a plurality of individual processors. Moreover, explicit use of the term "processor" should not be construed to refer exclusively to hardware capable of executing software, and may implicitly include, but not limited to, digital signal processor (DSP) hardware, network processor, application specific integrated circuit (ASIC), field programmable gate array (FPGA), read only memory (ROM) for storing software, random access memory (RAM), and non-volatile storage. Other hardware known to a person skilled in the art may also be included.

In some embodiments, the control module 118 may be communicably coupled to a user interface 122 configured to receive user instructions, for example setting a desired temperature of hot water to be drawn from the water heater 100. The user interface 122 may be implemented as a keypad device operably mounted on exterior of the tank 102 to allow the user to access the keypad device to set the desired temperature. In another embodiment, the user interface 122 may be implemented as a touch screen device with or without haptic feedback. In some embodiments, the user interface 122 may be a remote device configured to wirelessly communicate with the control module 118. Upon receipt of the input from the user interface 122, the control module 118 may be configured to store in the memory 120, a value of the desired temperature associated with user input. Based on the user input, the control module 118 is configured to regulate operation of the water heater 100. Besides the user interface 122, the control module 118 is communicably coupled to each of the first heater 114-1, the second heater 114-2, the first temperature sensor 116-1, the second temperature sensor 116-2, and an emergency-cutoff (ECO) 124. The control module 118 may be configured to selectively actuate each of the first heater 114-1 and the second heater 114-2 based on inputs from the first temperature sensor 116-1, the second temperature sensor 116-2, and the user interface 122.

According to an embodiment of the present disclosure, the water heater 100 includes an electronic mixing valve 126 disposed along the inlet pipe 104 and communicably coupled to each of the inlet temperature sensor 110 and the outlet temperature sensor 112. In one embodiment, the electronic mixing valve 126 is coupled to a junction where the bypass conduit 108 branches from the inlet pipe 104 and is configured to adjust flow of cold water from the inlet pipe 104 to the outlet pipe 106 through the bypass conduit 108. A mixing valve motor 128 and a mixing valve controller 130 constitutes the electronic mixing valve 126.

At beginning of draw of water from the tank 102, the initial flow of water through the outlet pipe 106 may be non-heated water or cold water, and a condition of the electronic mixing valve 126 corresponding to such draw of water may be referred to as "neutral condition". Upon beginning of draw of the water, the control module 118 is configured to actuate the heaters 114 to heat the water within the tank 102. In order to allow flow of heated water through the outlet pipe 106, cold water is supplied to the bottom of the tank 102. Such supply of cold water into the tank 102 increases volume of water within the tank 102 and forces the heated water to flow through the outlet pipe 106. A condition of the electronic mixing valve 126 corresponding to the increase in flow of cold water through the inlet pipe 104 may be referred to as "first condition". In operation, the electronic mixing valve 126 is configured to receive temperature data of the mixture of hot water and cold water from the outlet temperature sensor 112 and compare temperature of the mixture of hot water and cold water with a predefined temperature value. As used herein, the term "predefined temperature value" refers to a desired temperature set by the user. The electronic mixing valve 126 is communicably coupled to the control module 118. For example, the mixing valve controller 130 may be configured to send and receive inputs from the control module 118, such as receiving data related to the predefined temperature value. In an embodiment, the mixing valve controller 130 may be in communication with the control module 118 using a communication architecture, such as, for example RS-485 communication channel.

The electronic mixing valve 126 constantly receives the temperature data of the hot water at the beginning of the draw of water from the tank, and temperature data of the mixture of hot water and cold water (hereinafter referred to as "the water mixture"), from the outlet temperature sensor 112. During constant flow of the hot water or the water mixture, temperature sensed by the outlet temperature sensor 112 may be constant or may vary within few degrees centigrade. Accordingly, the electronic mixing valve 126 may be configured to consider such instances as "flow" condition. In response to determining that the water mixture is flowing through the outlet pipe, the electronic mixing valve 126 is configured to regulate the flow of cold water through at least one of the bypass conduit 108 and the inlet pipe 104 until the temperature of the water mixture is within a predetermined range of the predefined temperature value. As used herein, the term "predetermined range" includes a margin for about 5° C. with respect to the predefined temperature value. For example, when the predefined temperature value is 50° C., the predetermined range may be between 45° C. and 55° C. However, in some embodiments, the electronic mixing valve 126 may be configured to regulate the flow of cold water through at least one of the bypass conduit 108 and the inlet pipe 104 until the temperature of the mixture of hot water and cold water is equal to the predefined temperature value. For instance, the electronic mixing valve 126 is configured to reduce an amount of cold water flowing through the bypass conduit 108 when the temperature of the water mixture is less than the predefined temperature value, based on the flow of the water mixture through the outlet pipe 106. However, when the temperature of the water mixture is greater than the predefined temperature value, the electronic mixing valve 126 is configured to increase amount of cold water flowing through the bypass conduit 108. A condition of the electronic mixing valve 126 corresponding to the increase in flow of cold water through the bypass conduit 108 may be referred to as "second condition". In an embodiment, as the temperature of the water mixture transitions from warm to hot, the mixing valve controller 130 may be configured to actuate the mixing valve motor 128 gradually from the first condition to the second condition.

During constant draw of water from the tank 102, volume of cold water supplied to the tank 102 may also need to be monitored. Additionally, based on the predefined temperature value, the water in the tank 102 is heated by the heaters 114. In an embodiment, the electronic mixing valve 126 is communicably coupled to the one or more tank temperature sensors 116 to receive temperature data of water within the tank 102. Based on the temperature data, the electronic mixing valve 126 is configured to determine whether the temperature of water within the tank 102 is greater than a threshold temperature value. As used herein, the term "threshold temperature value" may refer to the maximum temperature sustained by the tank 102. In some embodiments, the threshold temperature value may be set by the user and such setting may be stored in the memory 120 of the control module 118.

When the draw of the water mixture stops, flow of the water mixture through the outlet pipe 106 is restricted, resulting in increase of pressure in the outlet pipe 106. Such increase in pressure may cause increase in temperature of the water mixture in the outlet pipe 106. On receiving the temperature data associated with such sudden increase in temperature of the water mixture, the electronic mixing valve 126 may be configured to consider such instances as "no flow" condition. Additionally, due to accumulation of hot water within the tank 102, temperature of water in the inlet pipe 104 may also gradually increase. Based on the temperature data of water from the inlet temperature sensor 110, such instances of increase in temperature of water in the inlet pipe 104 may also be determined as "no flow" condition. Accordingly, in the "no flow" condition, the electronic mixing valve 126 may be actuated to the neutral condition. In some embodiments, the mixing valve controller 130 may be configured to retain the mixing valve motor 128 in a same operation condition, such as the neutral condition, until a subsequent draw of water is initiated.

During "no flow" condition, continued heating of the water within the tank 102 may lead to increase in temperature of the water within the tank 102. When the temperature of the water within the tank 102 is greater than the threshold temperature value, the mixing valve controller 130 is configured to actuate the mixing valve motor 128 to regulate the flow of cold water through the inlet pipe 104. In some embodiments, the mixing valve controller 130 may be configured to actuate the control module 118 to regulate supply of the electric current to the heaters 114 when the temperature of the water within the tank 102 is greater than the threshold temperature value. In an embodiment, the electronic mixing valve 126 may include a battery backup, for example a supercapacitor. In case of power outage or power loss, the mixing valve controller 130 may be configured to use power from the battery backup to continue operation thereof until power in the battery backup is drained off. In some embodiments, upon determining a power outage condition, the mixing valve controller 130 may be configured to actuate the mixing valve motor 128 to the neutral condition and send a signal to the control module 118 indicative of the power loss. The control module 118 may further notify the user, via the user interface, regarding the power loss.

Figure 2:
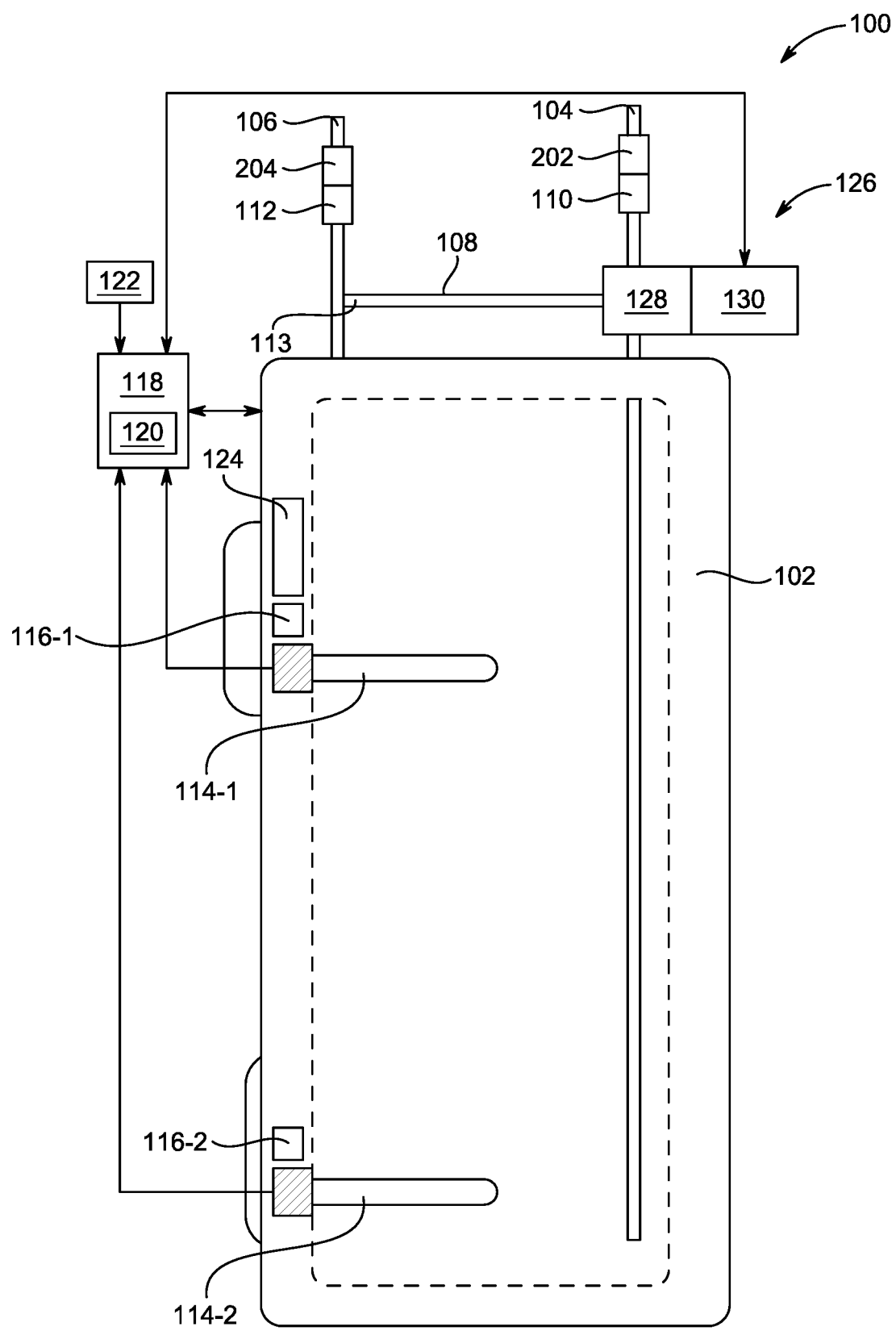
FIG. 2 is a schematic diagram of the water heater of FIG. 1 implementing flow sensors, according to an embodiment of the present disclosure.

FIG. 2 illustrates the water heater 100 implementing flow sensors. In an embodiment, the water heater 100 includes an inlet flow sensor 202 coupled to the inlet pipe 104 upstream of the electronic mixing valve 126 and an outlet flow sensor 204 coupled to the outlet pipe 106 downstream of the outlet 113 of the bypass conduit 108. The electronic mixing valve 126 is communicably coupled to the outlet flow sensor 204 and configured to determine the flow of the water mixture through the outlet pipe 106. In such configuration, dependency on the outlet temperature sensor 112 to determine the "flow" and "no flow" condition may be overcome.

Figure 3:
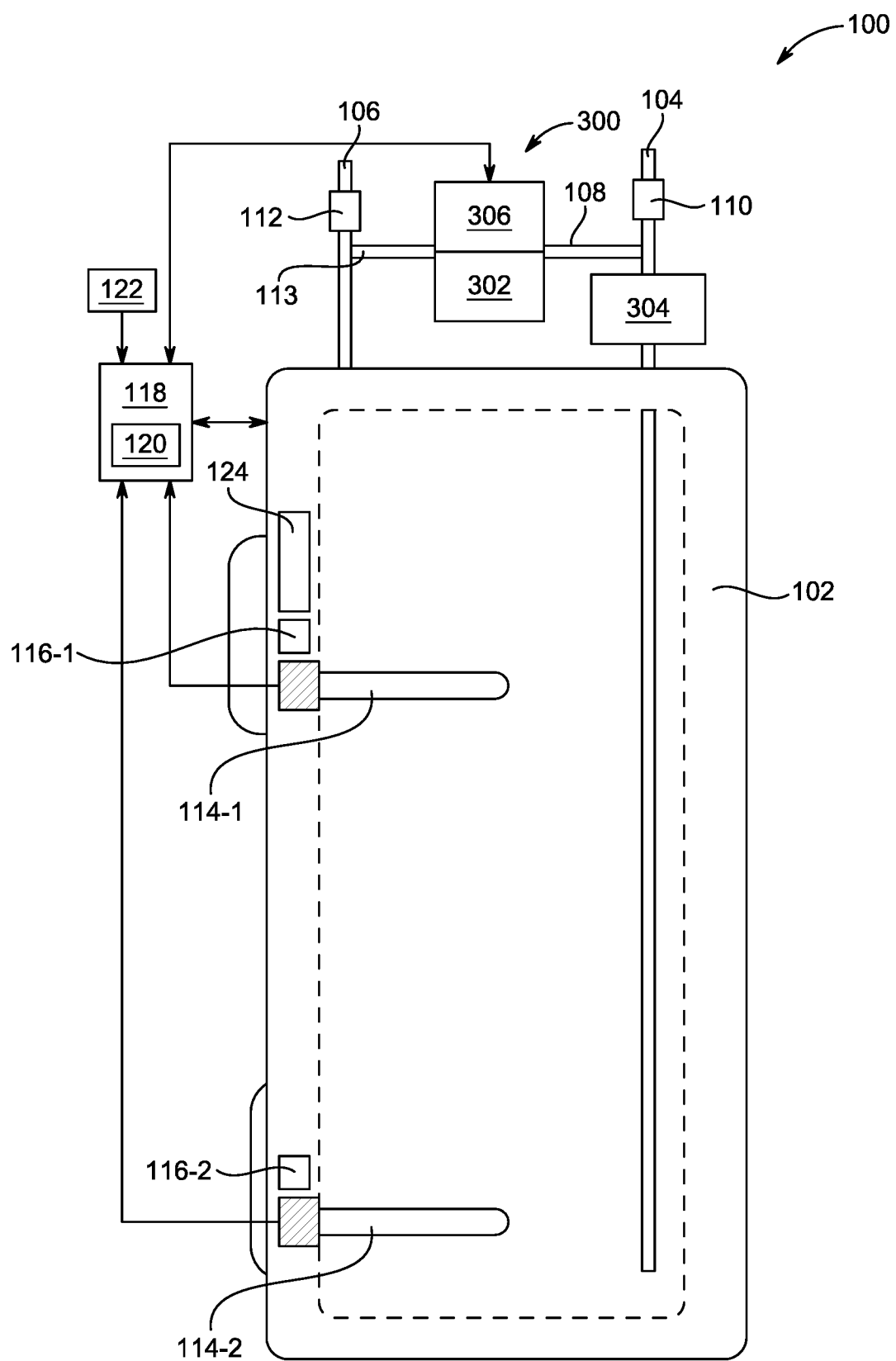
FIG. 3 is a schematic diagram of the water heater of FIG. 1 implementing an electronic mixing valve assembly, according to an embodiment of the present disclosure.

FIG. 3 illustrates the water heater 100 implementing an electronic mixing valve assembly 300. In an embodiment, the electronic mixing valve assembly 300 includes a first mixing valve motor 302 coupled to the bypass conduit 108, a second mixing valve motor 304 coupled to the inlet pipe 104, and a mixing valve controller 306 operably coupled to each of the first mixing valve motor 302 and the second mixing valve motor 304. As used herein, the term "operably coupled" refers to a capability of the mixing valve controller 306 to control operation of each of the first mixing valve motor 302 and the second mixing valve motor 304. The mixing valve controller 306 is communicably coupled to each of the outlet temperature sensor 112, the inlet flow sensor 202, and the outlet flow sensor 204. The mixing valve controller 306 is configured to receive temperature data of the water mixture from the outlet temperature sensor 112 and compare temperature of the water mixture with the predefined temperature value. In response to determining that the water mixture is flowing through the outlet pipe 106, the mixing valve controller 306 is configured to actuate at least one of the first mixing valve motor 302 and the second mixing valve motor 304 to regulate flow of cold water through the bypass conduit 108 and the inlet pipe 102, respectively, until the temperature of the water mixture is within the predetermined range of the predefined temperature value.

In an embodiment, the mixing valve controller 306 is configured to actuate the first mixing valve motor 302 to an open condition and the second mixing valve motor 304 to a closed condition to reduce the temperature of the water mixture, in response to determining that the temperature of the water mixture is greater than the predefined temperature value. Actuating the first mixing valve motor 302 to the open condition allows more amount of cold water to flow through the bypass conduit 108 and mix with the heated water flowing out of the tank 102, thereby reducing the temperature of the water mixture. Further, the mixing valve controller 306 is further configured to actuate the first mixing valve motor 302 to a closed condition and the second mixing valve motor 304 to an open condition to increase the temperature of the water mixture, in response to determining that the temperature of the water mixture is less than the predefined temperature value. Actuating the first mixing valve motor 302 to a closed condition restricts the flow of cold water through the bypass conduit 108, thereby allowing heated water to flow through the outlet pipe 106. Actuation of the second mixing valve motor 304 to an open condition allows more cold water to flow into the tank 102, thereby forcing the heated water to flow out of the tank 102 through the outlet pipe 106. Therefore, the electronic mixing valve assembly 300 regulates the temperature of the water mixture by regulating the flow of cold water through at least one of the bypass conduit 108 and the inlet pipe 104.

In an embodiment, the water heater 100 further includes a leak sensor 308 coupled to the tank 102 and configured to sense water leak from the tank 102. The control module 118 is coupled to the leak sensor 308 and configured to determine the water leak from the tank 102 based on an input from the leak sensor 308. For example, the input from the leak sensor 308 associated with a high voltage value may be indicative of the water leak from the tank 102. A threshold voltage value may be stored in the memory 120 of the control module 118, and the control module 118 may be configured to determine instances of the water leak only when the voltage value associated with the input is above the threshold voltage value. As such, actuation of the control module 118 based on false input generation by the leak sensor 308 may be eliminated. The mixing valve controller 306 is communicably coupled to the control module 118. In response to determining water leak from the tank 102, the mixing valve controller 306 is configured to actuate each of the first mixing valve motor 302 and the second mixing valve motor 304 to restrict the flow of cold water through the bypass conduit 108 and the inlet pipe 104, respectively. In some embodiments, the electronic mixing valve assembly 300 may be configured to restrict a total flow rate of water being supplied from the water heater 100. For example, the total flow rate may be an uninterrupted flow rate of water being supplied into the water heater 100.

Figure 4A:
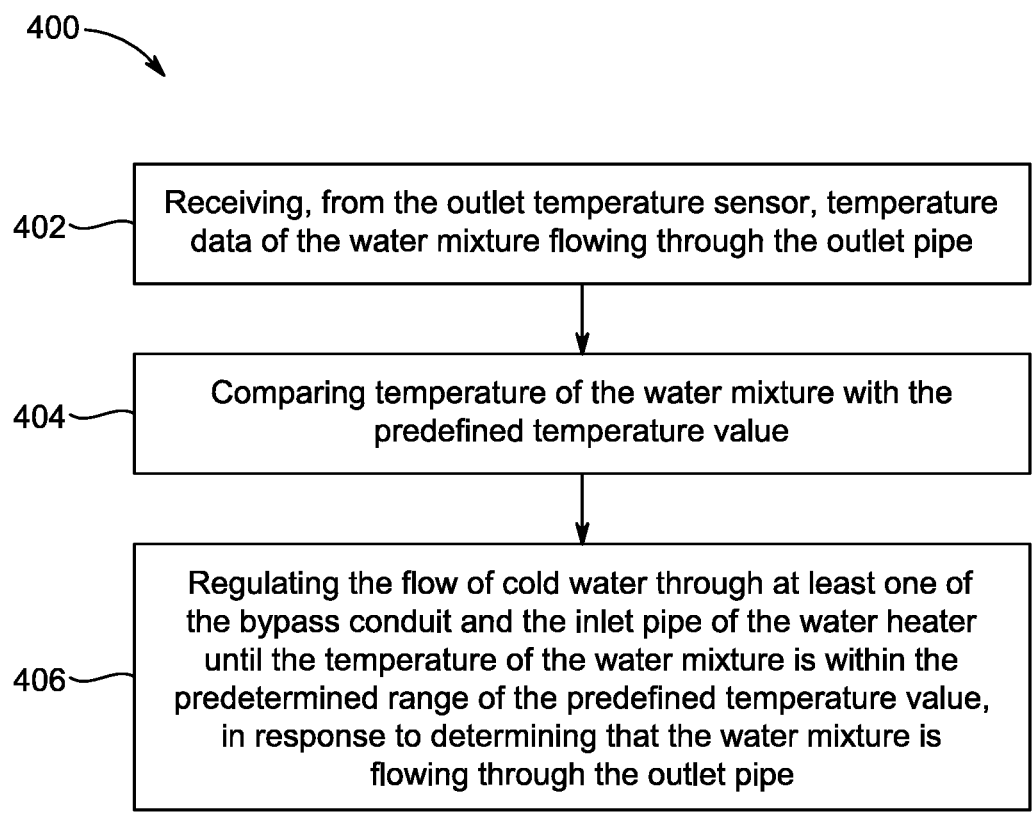
FIG. 4A is a flowchart of a method of operating the water heater, according to an embodiment of the present disclosure.
Figure 4B:
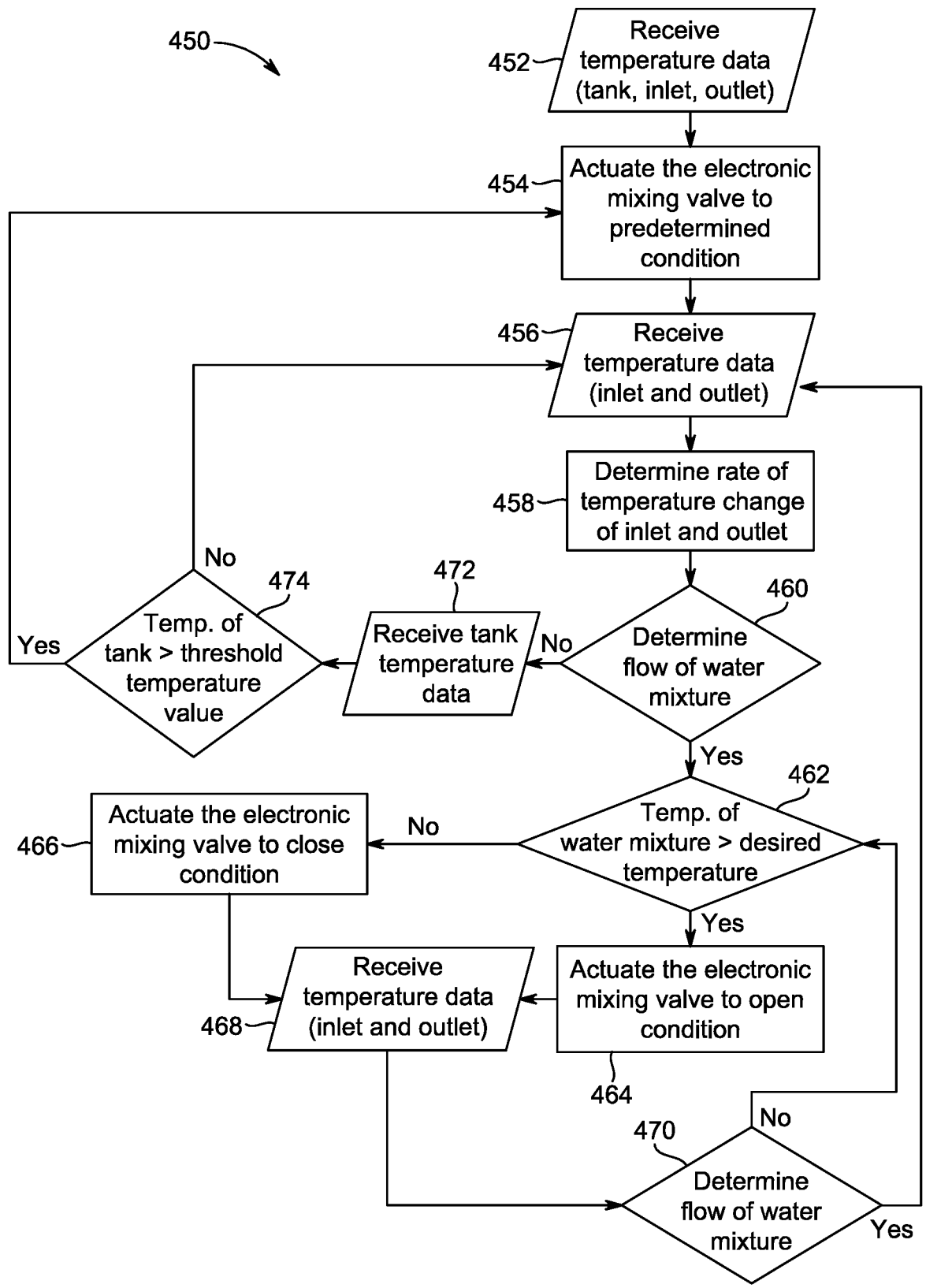
FIG. 4B is a flowchart of a method of operating the water heater, according to another embodiment of the present disclosure.

FIG. 4A and FIG. 4B illustrate flowcharts of a method 400 and a method 450, respectively, of operating the water heater 100 according to embodiments of the present disclosure. Particularly, the methods 400 and 450 are directed to regulate the temperature of the water mixture drawn from the water heater 100. The methods 400 and 450 will be described in conjunction with the FIG. 1 to FIG. 3. The order in which the methods 400 and 450 are described is not intended to be construed as a limitation, and any number of the described method blocks can be combined in any order to individually implement the methods 400 and 450. Additionally, individual blocks may be deleted from each of the methods 400 and 450 without departing from the scope of the present disclosure. Further, the methods 400 and 450 can be implemented in any suitable hardware, software, or a combination thereof. However, in the embodiments described below, the methods 400 and 450 are considered executed by the mixing valve controller 130, 306 of the electronic mixing valve 126, 300.

At step 402, the method 400 includes receiving, from the outlet temperature sensor 112, temperature data of the water mixture flowing through the outlet pipe 106.

At step 404, the method 400 includes comparing temperature of the water mixture with the predefined temperature value.

At step 406, the method 400 includes regulating the flow of cold water through at least one of the bypass conduit 108 and the inlet pipe 104 of the water heater 100 until the temperature of the water mixture is within the predetermined range of the predefined temperature value, in response to determining that the water mixture is flowing through the outlet pipe 106.

Although not specifically illustrated as blocks in the FIG. 4A, the method 400 further includes determining, via the leak sensor 308, whether water is leaking from the tank 102 and stopping the flow of cold water through the inlet pipe 104 and the bypass conduit 108, based on determining presence of the water leak.

The method 400 further includes actuating the first mixing valve motor 302 to an open condition and the second mixing valve motor 304 to the closed condition to reduce temperature of the water mixture, in response to determining that the temperature of the water mixture is greater than the predefined temperature value.

Referring to FIG. 4B, at step 452, the method 450 includes receiving temperature data from the tank temperature sensors 116, the inlet temperature sensor 110, and the outlet temperature sensor 112. As such, the method 450 at step 452 includes receiving the temperature data of water in the tank 102, the temperature data of cold water in the inlet pipe 104, and the temperature data of the water mixture in the outlet pipe 106. In an embodiment, the mixing valve controller 130, 306 is configured to receive the respective temperature data from the tank temperature sensors 116, the inlet temperature sensor 110, and the outlet temperature sensor 112.

At step 454, the method 450 includes actuating the electronic mixing valve 126, particularly the mixing valve motor 128, to predetermined condition. Based on the temperature data of the water mixture in the outlet pipe 106, the mixing valve controller 130 is configured to actuate the mixing valve motor 128 to the first condition and the second condition from the neutral condition. As described earlier, the first condition of the mixing valve motor 128 corresponds to a degree of opening of valve at the start of the draw of water from the tank 102 and the second condition of the mixing valve motor 128 corresponds to a degree of opening of the valve once the heated water has begun to flow though the outlet pipe 106. The second condition of the mixing valve motor 128 allows large amount of cold water to flow through the bypass conduit 108 to reduce the temperature of the water mixture. In some embodiments, the method 450 at step 454 may also include actuating the mixing valve motor 128 between the first condition and the second condition until the temperature of the water mixture is within the predetermined range of the predefined temperature value.

At step 456, the method 450 includes receiving the temperature data of the cold water in the inlet pipe 104 from the inlet temperature sensor 110 and the temperature data of the water mixture from the outlet temperature sensor 112. The step 456 particularly enables the electronic mixing valve 126 to determine the temperature of the water mixture after the cold water is being mixed with the heated water.

At step 458, the method 450 includes determining rate of change of temperature value of the cold water and the water mixture. A rate of change of the temperature of the water mixture in the outlet pipe may be indicative of rate of heating of the water in the tank 102 by the heaters 114. In an embodiment, the electronic mixing valve 126 is communicably coupled to the control module 118 of the water heater 100 to regulate supply of electric current to the heaters 114 to vary rate of heating of the water in the tank 102 based on, for example, a demand of the heated water.

At step 460, the method 450 includes determining flow of the water mixture through the outlet pipe 106. In an embodiment, the method 450 includes determining flow of the water mixture through the outlet pipe 106 based on temperature data of the water mixture in the outlet pipe 106. For example, when the draw of water from the tank 102 is stopped, the water mixture may accumulate in the outlet pipe 106, resulting in increase in temperature of the water mixture. Such temperature data combined with the rate of change of temperature value of the water mixture may be indicative of the "flow" and "no flow" condition.

At step 462, the method 450 includes determining whether the temperature of the water mixture is greater than the predefined temperature value, in response to determining that the water mixture is flowing through the outlet pipe 106. As described earlier, the predefined temperature value refers to the desired temperature of the water mixture set by the user.

At step 464, the method 450 includes actuating the electronic mixing valve 126, particularly the mixing valve motor 128, to open condition when the temperature of the water mixture is greater than the predefined temperature value. In an embodiment, the method 450 at step 464 includes actuating the mixing valve motor 128 to the second condition, through the first condition, from the neutral condition. In the second condition, the mixing valve motor 128 allows large amount of cold water to flow through the bypass conduit 108 to reduce temperature of the water mixture. In embodiments where the water heater 100 include the electronic mixing valve assembly 300, the method 450 includes actuating the first mixing valve motor 302 to the open condition and the second mixing valve motor 304 to the closed condition to reduce the temperature of the water mixture.

At step 466, the method 450 includes actuating the electronic mixing valve 126, particularly the mixing valve motor 128, to closed condition when the temperature of the water mixture is less than the predefined temperature value. In an embodiment, the method 450 at step 466 includes actuating the mixing valve motor 128 to the neutral condition, thereby restricting or reducing the flow of cold water through the bypass conduit 108. In embodiments where the water heater 100 include the electronic mixing valve assembly 300, the method 450 includes actuating the first mixing valve motor 302 to the closed condition and the second mixing valve motor 304 to the open condition to increase the temperature of the water mixture.

Upon actuating the mixing valve motor 128 to the open condition or the closed condition based on the step 462, the method 450 at step 468 includes receiving the temperature data of the cold water in the inlet pipe 104 from the inlet temperature sensor 110 and the temperature data of the water mixture from the outlet temperature sensor 112. The step 468 particularly enables the electronic mixing valve 126 to determine the temperature of the water mixture post actuation of the mixing valve motor 128.

At step 470, the method 450 includes determining flow of the water mixture through the outlet pipe 106. In cases where the electronic mixing valve 126 determines that the flow of water mixture has stopped, the method 450 returns to step 456 to receive the temperature data of the cold water in the inlet pipe 104 from the inlet temperature sensor 110 and the temperature data of the water mixture from the outlet temperature sensor 112. However, if the electronic mixing valve 126 determines presence of flow of the water mixture, the method 450 returns to step 462 to determine whether the temperature of the water mixture is greater than the predefined temperature value.

In response to determining no flow of the water mixture at step 460, the method 450 at step 472 includes receiving temperature data of the water in the tank 102 from the tank temperature sensors 116.

At step 474, the method 450 includes determining whether the temperature of water within the tank 102 is greater than the threshold temperature value. The method 450 includes receiving the temperature data of the cold water in the inlet pipe 104 from the inlet temperature sensor 110 and the temperature data of the water mixture from the outlet temperature sensor 112, when the temperature of water within the tank 102 is less than the threshold temperature value. However, when the temperature of water within the tank 102 is greater than the threshold temperature value, the method 450 includes actuating the electronic mixing valve 126 to the neutral condition.

Figure 5:
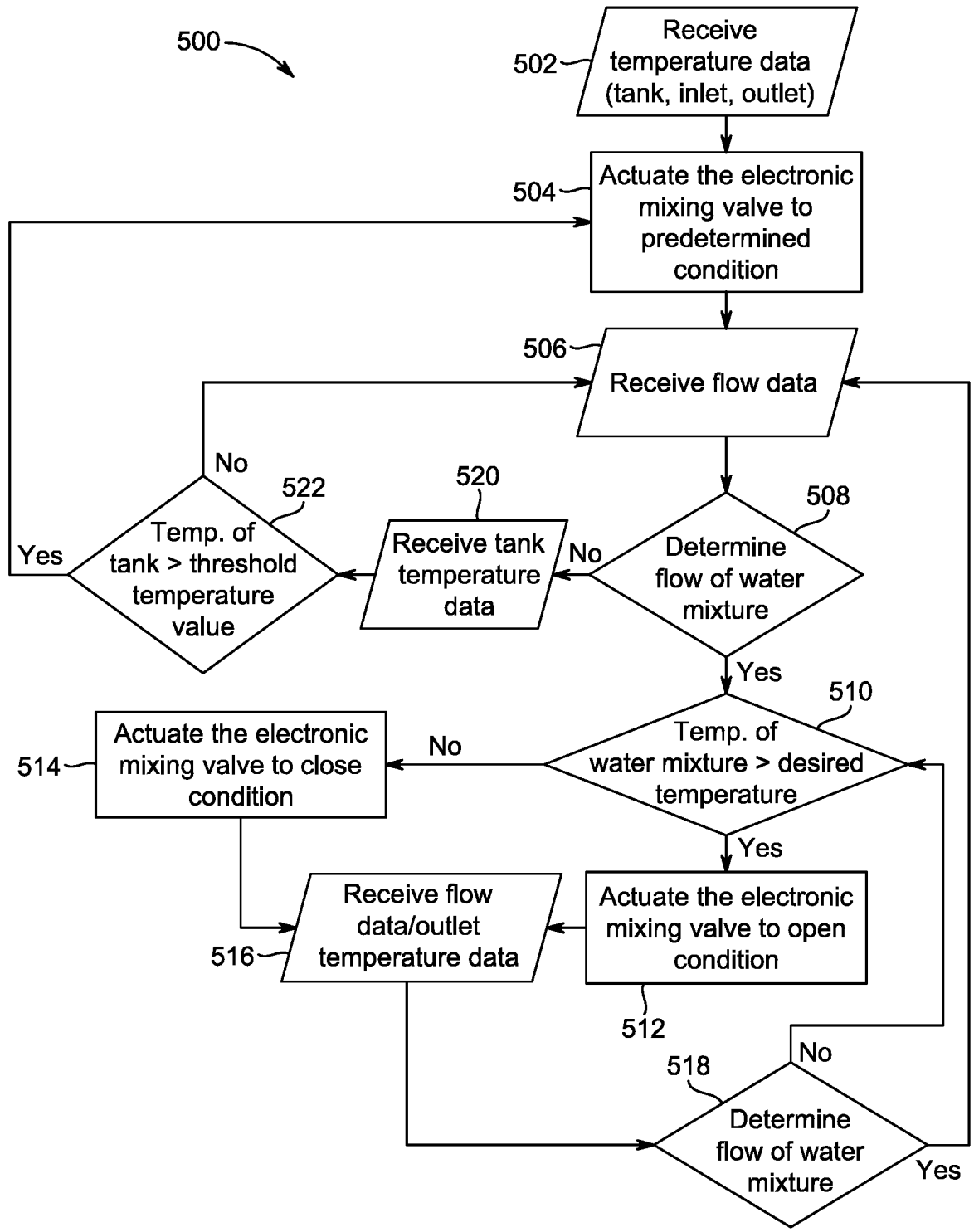
FIG. 5 is a flowchart of a method of operating the water heater implementing a flow sensor, according to an embodiment of the present disclosure.

FIG. 5 illustrates a flowchart of a method 500 of operating the water heater 100 implementing flow sensors. Particularly, the method 500 is directed to regulate the temperature of the water mixture drawn from the water heater 100. The method 500 will be described in conjunction with the FIG. 1 to FIG. 3. The order in which the method 500 is described is not intended to be construed as a limitation, and any number of the described method blocks can be combined in any order to individually implement the method 500. Additionally, individual blocks may be deleted from each of the method 500 without departing from the scope of the present disclosure. Further, the method 500 can be implemented in any suitable hardware, software, or a combination thereof. However, in the embodiments described below, the method 500 is considered executed by the mixing valve controller 130, 306 of the electronic mixing valve 126, 300.

At step 502, the method 500 includes receiving temperature data from the tank temperature sensors 116, the inlet temperature sensor 110, and the outlet temperature sensor 112. As such, the method 500 at step 502 includes receiving the temperature data of water in the tank 102, the temperature data of cold water in the inlet pipe 104, and the temperature data of the water mixture in the outlet pipe 106.

At step 504, the method 500 includes actuating the electronic mixing valve 126, particularly the mixing valve motor 128, to the predetermined condition. Based on the temperature data of the water mixture in the outlet pipe 106, the mixing valve controller 130 is configured to actuate the mixing valve motor 128 to the first condition and the second condition from the neutral condition.

At step 506, the method 500 includes receiving flow data from the inlet flow sensor 202 and the outlet flow sensor 204.

At step 508, the method 500 includes determining flow of the water mixture through the outlet pipe 106 based on the flow data.

At step 510, the method 500 includes determining whether the temperature of the water mixture is greater than the predefined temperature value, in response to determining that the water mixture is flowing through the outlet pipe 106.

At step 512, the method 500 includes actuating the electronic mixing valve 126, particularly the mixing valve motor 128, to open condition when the temperature of the water mixture is greater than the predefined temperature value. In an embodiment, the method 500 at step 512 includes actuating the mixing valve motor 128 to the second condition, through the first condition, from the neutral condition. In the second condition, the mixing valve motor 128 allows large amount of cold water to flow through the bypass conduit 108 to reduce temperature of the water mixture. In embodiments where the water heater 100 include the electronic mixing valve assembly 300, the method 500 includes actuating the first mixing valve motor 302 to the open condition and the second mixing valve motor 304 to the closed condition to reduce the temperature of the water mixture.

At step 514, the method 500 includes actuating the electronic mixing valve 126, particularly the mixing valve motor 128, to closed condition when the temperature of the water mixture is less than the predefined temperature value. In an embodiment, the method 500 at step 514 includes actuating the mixing valve motor 128 to the neutral condition from the second condition, thereby restricting or reducing the flow of cold water through the bypass conduit 108. In embodiments where the water heater 100 include the electronic mixing valve assembly 300, the method 500 includes actuating the first mixing valve motor 302 to the closed condition and the second mixing valve motor 304 to the open condition to increase the temperature of the water mixture.

After actuating the mixing valve motor 128 to the open condition or the closed condition based on the step 510, the method 500 at step 516 includes receiving the flow data from the flow sensors 202, 204 or the temperature data of the water mixture from the outlet temperature sensor 112.

At step 518, the method 500 includes determining flow of the water mixture through the outlet pipe 106. In cases where the electronic mixing valve 126 determines that the flow of water mixture has stopped, the method 500 returns to step 506 to receive the flow data from the flow sensors 202, 204. However, if the electronic mixing valve 126 determines presence of flow of the water mixture, the method 500 returns to step 510 to determine whether the temperature of the water mixture is greater than the predefined temperature value.

In response to determining no flow of the water mixture at step 508, the method 500 at step 520 includes receiving temperature data of the water in the tank 102 from the tank temperature sensors 116.

At step 522, the method 500 includes determining whether the temperature of water within the tank 102 is greater than the threshold temperature value. The method 500 includes receiving the flow data from the inlet flow sensor 202 and the outlet flow sensor 204, when the temperature of water within the tank 102 is less than the threshold temperature value. However, when the temperature of water within the tank 102 is greater than the threshold temperature value, the method 500 includes actuating the electronic mixing valve 126 to the neutral condition.

Figure 6:
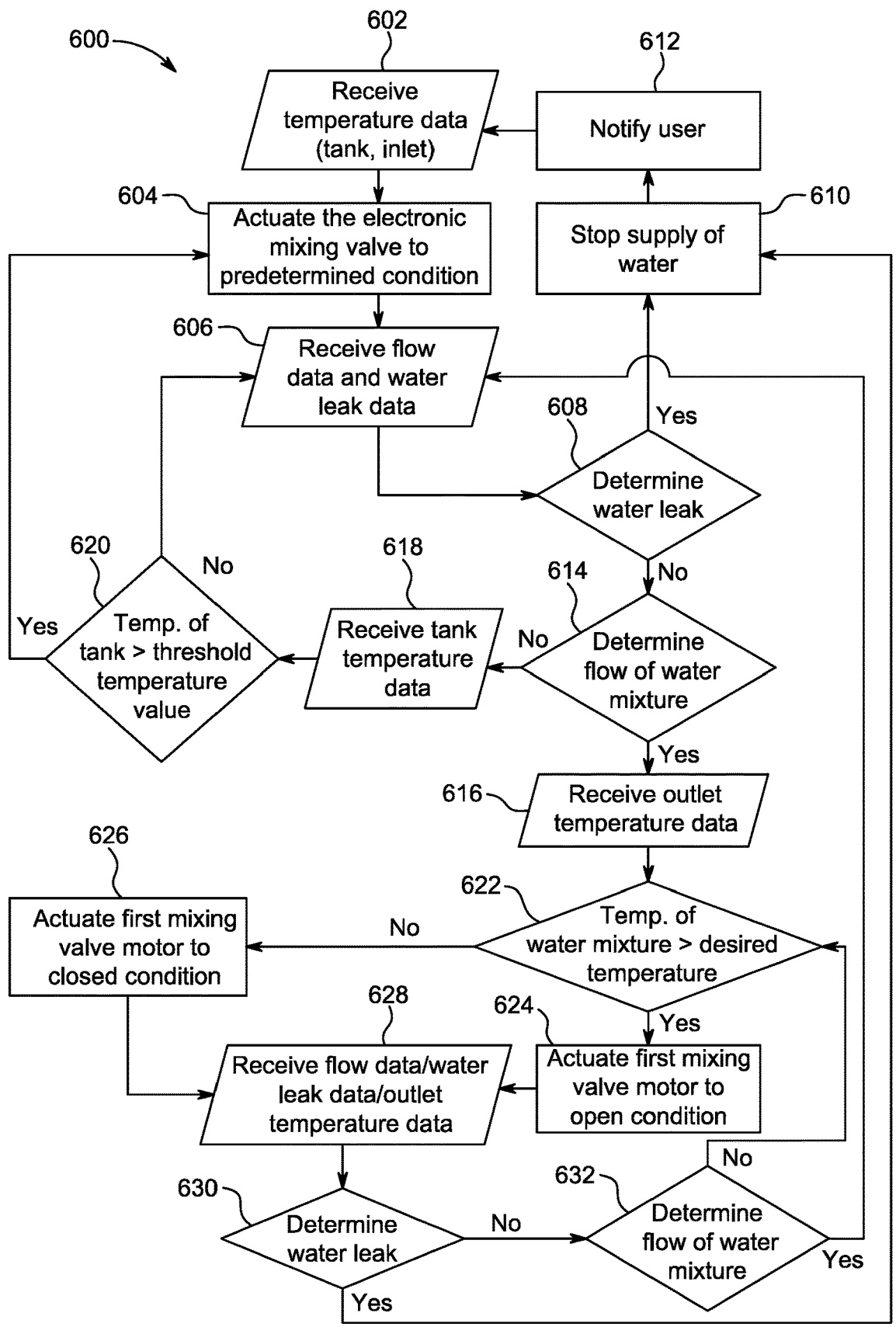
FIG. 6 is flowchart of a method of operating the water heater implementing the flow sensor and a leak sensor, according to an embodiment of the present disclosure.

FIG. 6 illustrates a flowchart of a method 600 of operating the water heater 100 implementing the leak sensor 308, according to an embodiment of the present disclosure. Particularly, the method 600 is directed to regulate the temperature of the water mixture drawn from the water heater 100. The method 600 will be described in conjunction with the FIG. 1 to FIG. 3. The order in which the method 600 is described is not intended to be construed as a limitation, and any number of the described method blocks can be combined in any order to individually implement the method 600. Additionally, individual blocks may be deleted from each of the method 600 without departing from the scope of the present disclosure. Further, the method 600 can be implemented in any suitable hardware, software, or a combination thereof. However, in the embodiments described below, the method 500 is considered executed by the mixing valve controller 130, 306 of the electronic mixing valve 126, 300.

At step 602, the method 600 includes receiving temperature data from the tank temperature sensors 116 and the inlet temperature sensor 110. As such, the method 600 at step 602 includes receiving the temperature data of water in the tank 102 and the temperature data of cold water in the inlet pipe 104.

At step 604, the method 600 includes actuating the electronic mixing valve 126, particularly the mixing valve motor 128, to the predetermined condition. Based on the temperature data of water in the tank 102 and the temperature data of cold water in the inlet pipe 104, the mixing valve controller 130 is configured to actuate the mixing valve motor 128 to the first condition and the second condition from the neutral condition.

At step 606, the method 600 includes receiving flow data from the inlet flow sensor 202 and the outlet flow sensor 204 and receiving water leak data from the leak sensor 308.

At step 608, the method 600 includes determining presence of water leak from the tank 102, based on the water leak data received from the leak sensor 308.

In cases where the water leak is detected, the method 600, at step 610, includes stopping supply of water to the tank 102. In an embodiment, the method 600 includes actuating, by the mixing valve controller 130, the mixing valve motor 128 to closed condition to restrict flow of water into the tank 102 and into the bypass conduit 108. In embodiments where the water heater includes the electronic mixing valve assembly 300, the method 600 includes actuating, by the mixing valve controller 306, the first mixing valve motor 302 and the second mixing valve motor 304 to closed condition to restrict flow of cold water into the tank 102 and through the bypass conduit 108.

Subsequently, the method 600 at step 612 includes notifying the user about the water leak from the tank 102. In an embodiment, the method 600 at step 612 may include notifying the user to fix the water leak and reset the electronic mixing valve 126, 300. Once the electronic mixing valve 126, 300 is reset, the method 600 continues to receive temperature data from the tank temperature sensors 116 and the inlet temperature sensor 110.

In response to determining no water leak from the tank 102, the method 600 at step 614 includes determining flow of the water mixture through the outlet pipe 106.

At step 616, the method 600 includes receiving temperature data of the water mixture from the outlet temperature sensor 112, in response to determining flow of the water mixture through the outlet pipe 106.

In response to determining no flow of the water mixture at step 614, the method 600 at step 618 includes receiving temperature data of the water in the tank 102 from the tank temperature sensors 116.

At step 620, the method 600 includes determining whether the temperature of water within the tank 102 is greater than the threshold temperature value. The method 600 includes receiving the flow data and water leak data, when the temperature of water within the tank 102 is less than the threshold temperature value. However, when the temperature of water within the tank 102 is greater than the threshold temperature value, the method 600 includes actuating the electronic mixing valve 126 to the neutral condition.

Further, at step 622, the method 600 includes determining whether the temperature of the water mixture is greater than the predefined temperature value, in response to determining that the water mixture is flowing through the outlet pipe 106.

At step 624, the method 600 includes actuating the electronic mixing valve 126, particularly the mixing valve motor 128, to open condition when the temperature of the water mixture is greater than the predefined temperature value. In an embodiment, the method 600 at step 624 includes actuating the mixing valve motor 128 to the second condition, through the first condition, from the neutral condition. In the second condition, the mixing valve motor 128 allows large amount of cold water to flow through the bypass conduit 108 to reduce temperature of the water mixture. In embodiments where the water heater 100 include the electronic mixing valve assembly 300, the method 600 includes actuating the first mixing valve motor 302 to the open condition and the second mixing valve motor 304 to the closed condition to reduce the temperature of the water mixture.

At step 626, the method 600 includes actuating the electronic mixing valve 126, particularly the mixing valve motor 128, to closed condition when the temperature of the water mixture is less than the predefined temperature value. In an embodiment, the method 600 at step 626 includes actuating the mixing valve motor 128 to the neutral condition from the second condition, thereby restricting or reducing the flow of cold water through the bypass conduit 108. In embodiments where the water heater 100 include the electronic mixing valve assembly 300, the method 600 includes actuating the first mixing valve motor 302 to the closed condition and the second mixing valve motor 304 to the open condition to increase the temperature of the water mixture.

After actuating the mixing valve motor 128 to the open condition or the closed condition based on the step 622, the method 600 at step 628 includes receiving the flow data from the flow sensors 202, 204, the water leak data from the leak sensor 308, or the temperature data of the water mixture from the outlet temperature sensor 112.

At step 630, the method 600 includes determining presence of water leak from the tank 102, based on the water leak data received from the leak sensor 308.

In cases where the water leak is detected at step 630, the method 600, at step 610, includes stopping supply of water to the tank 102. In an embodiment, the method 600 includes actuating, by the mixing valve controller 130, the mixing valve motor 128 to closed condition to restrict flow of water into the tank 102 and into the bypass conduit 108.

In case no water leak is detected, the method 600, at step 632, includes determining flow of the water mixture through the outlet pipe 106.

In response to determining no flow of the water mixture at step 632, the method 600 at step 622 includes determining whether the temperature of the water mixture is greater than the predefined temperature value. In case of flow of the water mixture is determined, the method 600 includes receiving flow data from the inlet flow sensor 202 and the outlet flow sensor 204 and receiving water leak data from the leak sensor 308.

Figure 7:
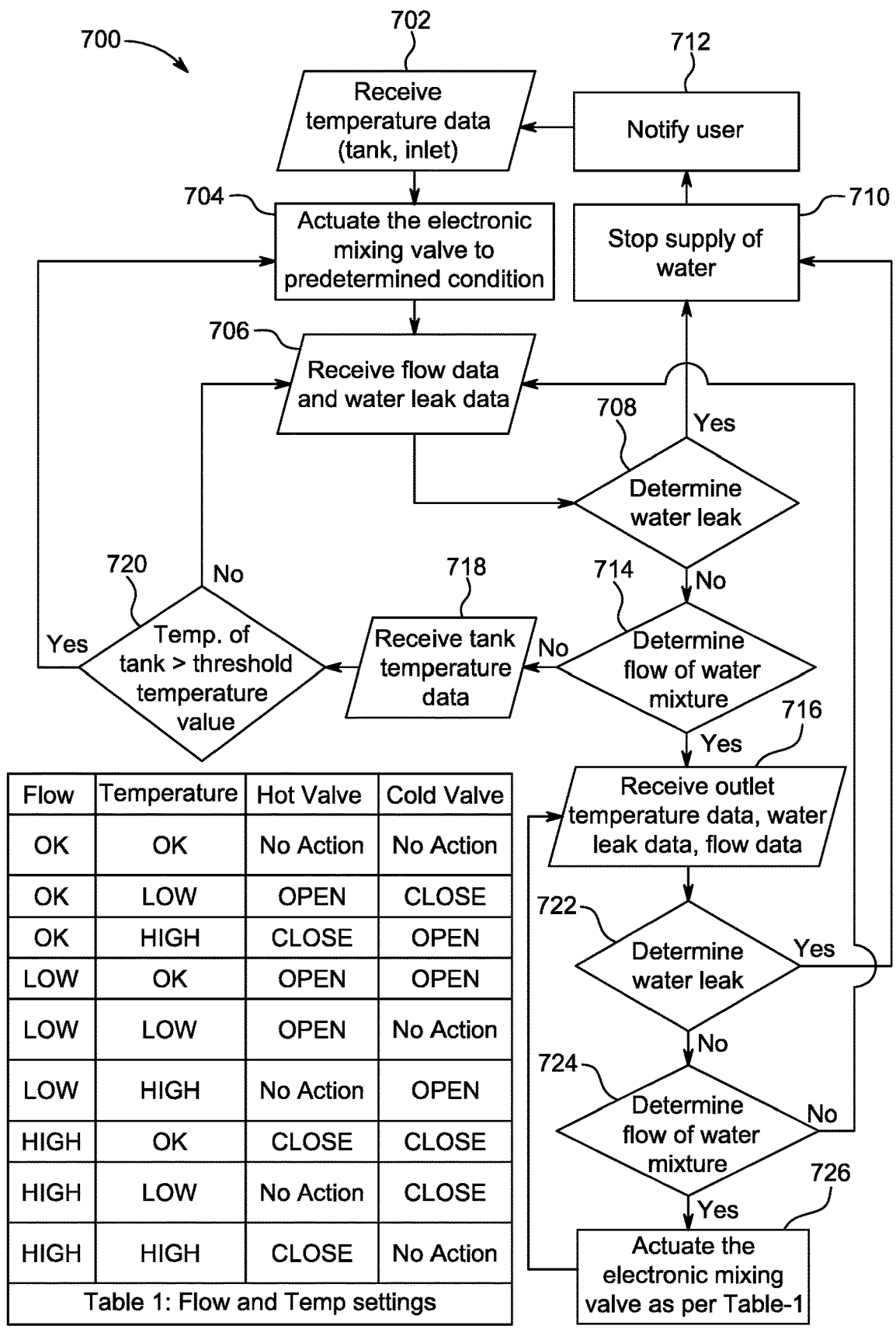
FIG. 7 is flowchart of a method of operating the water heater implementing the flow sensor and the leak sensor, according to another embodiment of the present disclosure.

FIG. 7 illustrates a flowchart of a method 700 of operating the water heater 100 implementing the leak sensor 308, according to another embodiment of the present disclosure. Particularly, the method 700 is directed to regulate the temperature of the water mixture drawn from the water heater 100. The method 700 will be described in conjunction with the FIG. 1 to FIG. 3. The order in which the method 700 is described is not intended to be construed as a limitation, and any number of the described method blocks can be combined in any order to individually implement the method 700. Additionally, individual blocks may be deleted from each of the method 700 without departing from the scope of the present disclosure. Further, the method 700 can be implemented in any suitable hardware, software, or a combination thereof. However, in the embodiments described below, the method 700 is considered executed by the mixing valve controller 130, 306 of the electronic mixing valve 126, 300.

At step 702, the method 700 includes receiving temperature data from the tank temperature sensors 116 and the inlet temperature sensor 110. As such, the method 700 at step 702 includes receiving the temperature data of water in the tank 102 and the temperature data of cold water in the inlet pipe 104.

At step 704, the method 700 includes actuating the electronic mixing valve 126, particularly the mixing valve motor 128, to the predetermined condition. Based on the temperature data of water in the tank 102 and the temperature data of cold water in the inlet pipe 104, the mixing valve controller 130 is configured to actuate the mixing valve motor 128 to the first condition and the second condition from the neutral condition.

At step 706, the method 700 includes receiving flow data from the inlet flow sensor 202 and the outlet flow sensor 204 and receiving water leak data from the leak sensor 308.

At step 708, the method 700 includes determining presence of water leak from the tank 102, based on the water leak data received from the leak sensor 308.

In cases where the water leak is detected, the method 700, at step 710, includes stopping supply of water to the tank 102. In an embodiment, the method 700 includes actuating, by the mixing valve controller 130, the mixing valve motor 128 to closed condition to restrict flow of water into the tank 102 and into the bypass conduit 108. In embodiments where the water heater includes the electronic mixing valve assembly 300, the method 700 includes actuating, by the mixing valve controller 306, the first mixing valve motor 302 and the second mixing valve motor 304 to closed condition to restrict flow of cold water into the tank 102 and through the bypass conduit 108.

Subsequently, the method 700 at step 712 includes notifying the user about the water leak from the tank 102. In an embodiment, the method 700 at step 712 may include notifying the user to fix the water leak and reset the electronic mixing valve 126, 300. Once the electronic mixing valve 126, 300 is reset, the method 700 continues to receive temperature data from the tank temperature sensors 116 and the inlet temperature sensor 110.

In response to determining no water leak from the tank 102, the method 700 at step 714 includes determining flow of the water mixture through the outlet pipe 106.

At step 716, the method 600 includes receiving temperature data of the water mixture from the outlet temperature sensor 112, water leak data from the leak sensor 308, and flow data from the flow sensors 202, 204, in response to determining flow of the water mixture through the outlet pipe 106.

In response to determining no flow of the water mixture at step 714, the method 700 at step 718 includes receiving temperature data of the water in the tank 102 from the tank temperature sensors 116.

At step 720, the method 700 includes determining whether the temperature of water within the tank 102 is greater than the threshold temperature value. The method 700 includes receiving the flow data and water leak data, when the temperature of water within the tank 102 is less than the threshold temperature value. However, when the temperature of water within the tank 102 is greater than the threshold temperature value, the method 700 includes actuating the electronic mixing valve 126 to the neutral condition.

Based on the temperature data of the water mixture, the water leak data and the flow data, the method 700, at step 722, includes determining presence of water leak from the tank 102. In cases where the water leak is detected at step 722, the method 700 includes stopping supply of water to the tank 102.

In response to determining no water leak from the tank 102, the method 700 at step 724 includes determining flow of the water mixture through the outlet pipe 106. In response to determining no flow of the water mixture at step 724, the method 700 includes receiving flow data and leak data to determine reason for no flow of the water mixture.

In cases where flow of the water mixture is determined at step 724, the method includes executing instructions as detailed in Table-1 in FIG. 7.

To this end, the water heater 100 and the methods of operating the water heater 100 with aid of a feedback loop is described. The feedback loop is established between the temperature sensors, the control module 118 of the water heater 100, and the electronic mixing valve 126. As described and illustrated in figures, the electronic mixing valve 126 is mounted along the inlet pipe 104 and distant from the outlet pipe 106 as compared to the conventional arrangement of mounting the mixing valve on the outlet pipe 106 or proximal to the outlet pipe 106. As such, the electronic mixing valve 126 is not influenced by the heated water flowing through the outlet pipe 106 and significantly reduces overshoot in temperature of water supplied from the water heater 100. Since the electronic mixing valve 126 constantly receives the temperature data of the water mixture from the outlet temperature sensor 112, amount of cold water required to mix with the heated water may be determined on real-time basis and may be allowed to flow through the bypass conduit 108. As such, temperature of the water mixture may be regulated by the electronic mixing valve 126. Therefore, instances of user being scalded due to slug of super-heated water may be eliminated.

Further, owing to presence of the feedback loop which operates when the electronic mixing valve 126 is idle, response to demand for draw of water from the tank 102 may be addressed quickly. The electronic mixing valve assembly 300, with the aid of the leak sensor 308, functions as a shut-off valve to restrict supply of water into the tank 102 in cases where the water leak is detected. Implementation of flow meters or flow sensors 202, 204 on the inlet pipe 104 and the outlet pipe 106 improves the operation of the water heater 100 and aids in minimizing overshoot of temperature of the water mixture, thereby reducing possibility of risk related to scalding.

While aspects of the present disclosure have been particularly shown and described with reference to the embodiments above, it will be understood by those skilled in the art that various additional embodiments may be contemplated by the modification of the disclosed methods without departing from the spirit and scope of what is disclosed. Such embodiments should be understood to fall within the scope of the present disclosure as determined based upon the claims and any equivalents thereof.

What is claimed is:
1. A water heater comprising:
a tank;
an inlet pipe configured to allow ingress of cold water to the tank;
an outlet pipe configured to allow egress of hot water from the tank;
a bypass conduit configured to allow flow of cold water from the inlet pipe to the outlet pipe, the bypass conduit having an inlet at a first junction of the bypass conduit and the inlet pipe and an outlet at a second junction of the bypass conduit and the outlet pipe;
an outlet temperature sensor coupled to the outlet pipe downstream of the outlet of the bypass conduit, the outlet temperature sensor configured to sense temperature of mixture of hot water and cold water in the outlet pipe; and
an electronic mixing valve disposed at the first junction such that cold water flows through the electronic mixing valve into the tank, the electronic mixing valve spaced apart from the second junction and communicably coupled to the outlet temperature sensor, the electronic mixing valve configured to:
receive temperature data of the mixture of hot water and cold water from the outlet temperature sensor;
compare temperature of the mixture of hot water and cold water with a predefined temperature value; and
in response to determining that the mixture of hot water and cold water is flowing through the outlet pipe, regulate the flow of cold water through at least one of the bypass conduit and the inlet pipe until the temperature of the mixture of hot water and cold water is within a predetermined range of the predefined temperature value.

2. The water heater of claim 1, further comprising one or more tank temperature sensors mounted on the tank and configured to sense temperature of water within the tank.

3. The water heater of claim 2, wherein the electronic mixing valve is communicably coupled to the one or more tank temperature sensors to receive temperature data of water within the tank.

4. The water heater of claim 3, wherein the electronic mixing valve is further configured to:
   determine whether the temperature of water within the tank is greater than a threshold temperature value; and
   actuate a mixing valve motor to regulate the flow of cold water through the inlet pipe when the temperature of the water within the tank is greater than the threshold temperature value.

5. The water heater of claim 4, wherein the electronic mixing valve is configured to operate the mixing valve motor to restrict the flow of cold water through the bypass conduit and allow the flow of cold water into the tank.

6. The water heater of claim 4, further comprising:
   one or more heaters configured to heat the water present in the tank; and
   a control module configured to regulate supply of electric current to the one or more heaters,
   wherein the electronic mixing valve is further configured to actuate the control module to regulate supply of the electric current to the one or more heaters when the temperature of the water within the tank is greater than the threshold temperature value.

7. The water heater of claim 1, wherein the electronic mixing valve is further configured to reduce an amount of cold water flowing through the bypass conduit when the temperature of hot water is less than the predefined temperature value, based on the flow of the mixture of hot water and cold water through the outlet pipe.

8. The water heater of claim 1, further comprising an outlet flow sensor coupled to the outlet pipe downstream of the outlet of the bypass conduit, wherein the electronic mixing valve is communicably coupled to the outlet flow sensor and configured to determine the flow of mixture of hot water and cold water through the outlet pipe based on an input from the outlet flow sensor.

9. A water heater comprising:
   a tank;
   an inlet pipe configured to allow ingress of cold water to the tank;
   an outlet pipe configured to allow egress of hot water from the tank;
   a bypass conduit configured to allow flow of cold water from the inlet pipe to the outlet pipe;
   an outlet temperature sensor coupled to the outlet pipe downstream of an outlet of the bypass conduit, the outlet temperature sensor configured to sense temperature of mixture of hot water and cold water in the outlet pipe; and
   an electronic mixing valve assembly communicably coupled to the outlet temperature sensor, the electronic mixing valve assembly comprising a first mixing valve motor coupled to the bypass conduit, a second mixing valve motor coupled to the inlet pipe, and a mixing valve controller operably coupled to each of the first mixing valve motor and the second mixing valve motor, wherein the mixing valve controller is configured to:
      receive temperature data of the mixture of hot water and cold water from the outlet temperature sensor;
      compare temperature of the mixture of hot water and cold water with a predefined temperature value; and
      in response to determining that the mixture of hot water and cold water is flowing through the outlet pipe, actuate at least one of the first mixing valve motor and the second mixing valve motor to regulate flow of cold water through the bypass conduit and the inlet pipe, respectively, until the temperature of the mixture of hot water and cold water is within a predetermined range of the predefined temperature value.

10. The water heater of claim 9, further comprising:
    a leak sensor coupled to the tank and configured to sense water leak from the tank; and
    a control module coupled to the leak sensor and configured to determine the water leak from the tank based on an input from the leak sensor.

11. The water heater of claim 10, wherein the mixing valve controller is communicably coupled to the control module, the mixing valve controller configured to actuate each of the first mixing valve motor and the second mixing valve motor to restrict the flow of cold water through the bypass conduit and the inlet pipe, respectively, in response to determining water leak from the tank.

12. The water heater of claim 9, further comprising:
    an inlet flow sensor mounted on the inlet pipe upstream of the second mixing valve motor and communicably coupled to the mixing valve controller, the inlet flow sensor configured to sense the flow of cold water through the inlet pipe; and
    an outlet flow sensor mounted on the outlet pipe downstream of the outlet of the bypass conduit and communicably coupled to the mixing valve controller, the outlet flow sensor configured to sense the flow of the mixture of hot water and cold water through the outlet pipe.

13. The water heater of claim 9, further comprising one or more tank temperature sensors mounted on the tank and configured to sense temperature of water within the tank.

14. The water heater of claim 13, wherein the mixing valve controller is communicably coupled to the one or more tank temperature sensors to receive temperature data of water within the tank.

15. The water heater of claim 9, wherein the mixing valve controller is further configured to actuate the first mixing valve motor to an open condition and the second mixing valve motor to a closed condition to reduce the temperature of the mixture of hot water and cold water, in response to determining that the temperature of the mixture of hot water and cold water is greater than the predefined temperature value.

16. The water heater of claim 15, wherein the mixing valve controller is further configured to actuate the first mixing valve motor to a closed condition and the second mixing valve motor to an open condition to increase the temperature of the mixture of hot water and cold water, in response to determining that the temperature of the mixture of hot water and cold water is less than the predefined temperature value.

17. A method of operating a water heater, the method comprising:
    receiving, from an outlet temperature sensor, temperature data of a mixture of hot water and cold water flowing through an outlet pipe of the water heater;
    comparing temperature of the mixture of hot water and cold water with a predefined temperature value;
    in response to determining that the mixture of hot water and cold water is flowing through the outlet pipe, regulating the flow of cold water through at least one of a bypass conduit and an inlet pipe of the water heater until the temperature of the mixture of hot water and cold water is within a predetermined range of the predefined temperature value; and
    actuating a first mixing valve motor of an electronic mixing valve assembly to an open condition and a second mixing valve motor of the electronic mixing valve assembly to a closed condition to reduce the temperature of the mixture of hot water and cold water, in response to determining that the temperature of the mixture of hot water and cold water is greater than the predefined temperature value.

18. The method of claim 17 further comprising:

determining, via a leak sensor, whether water is leaking from a tank of the water heater; and stopping the flow of cold water through the inlet pipe and the bypass conduit, based on determining presence of the water leak.

\* \* \* \* \*